(12) United States Patent
Taylor et al.

(10) Patent No.: US 8,657,309 B2
(45) Date of Patent: Feb. 25, 2014

(54) WHEELING DEVICE FOR A PACKAGED ARTICLE

(75) Inventors: Gerald Taylor, Luton (GB); Paul Whiles, Basingstoke (GB); Stephen Whiles, Basingstoke (GB)

(73) Assignee: Items Products (NPD) Limited, Bedfordshire (GB)

( * ) Notice: Subject to any disclaimer, the term of this patent is extended or adjusted under 35 U.S.C. 154(b) by 274 days.

(21) Appl. No.: 12/907,084

(22) Filed: Oct. 19, 2010

(65) Prior Publication Data

US 2011/0225767 A1 Sep. 22, 2011

(51) Int. Cl.
*B60B 7/02* (2006.01)

(52) U.S. Cl.
USPC ....... 280/47.32; 280/78; 280/79.11; 280/80.1

(58) Field of Classification Search
USPC ......... 280/44.32, 78, 79.11, 79.4, 87.01, 654, 280/80.1, 47.32
See application file for complete search history.

(56) References Cited

U.S. PATENT DOCUMENTS

| | | | | |
|---|---|---|---|---|
| 1,632,435 | A * | 6/1927 | Raleigh | 188/74 |
| 3,487,495 | A * | 1/1970 | Schultz, Jr. | 16/20 |
| 3,754,773 | A | 8/1973 | Bruno | |
| 3,861,703 | A | 1/1975 | Gould | |
| 3,889,965 | A | 6/1975 | Zeitlin | |
| 4,029,327 | A | 6/1977 | Kolstein | |
| 4,385,414 | A * | 5/1983 | Damico | 16/35 R |
| 4,449,268 | A * | 5/1984 | Schnuell | 16/35 R |
| 4,719,663 | A | 1/1988 | Termini | |
| 4,772,035 | A | 9/1988 | Danial | |
| 5,136,751 | A | 8/1992 | Coyne et al. | |
| 5,457,849 | A * | 10/1995 | Branson et al. | 16/19 |
| 5,940,932 | A | 8/1999 | LaHay | |
| 6,321,878 | B1 * | 11/2001 | Mobley et al. | 188/1.12 |
| 6,536,787 | B1 | 3/2003 | Shick | |
| 6,592,133 | B2 | 7/2003 | Powell | |
| 7,482,928 | B2 * | 1/2009 | Brackmann et al. | 340/572.1 |
| 2002/0003375 | A1 | 1/2002 | Kuo | |
| 2002/0024189 | A1 | 2/2002 | Chen | |
| 2003/0127815 | A1 | 7/2003 | Hall | |
| 2003/0155728 | A1 | 8/2003 | Dacosta | |
| 2005/0015928 | A1 | 1/2005 | Arsenault | |
| 2008/0078057 | A1 | 4/2008 | Hartman | |
| 2009/0106897 | A1 | 4/2009 | Harrow | |

FOREIGN PATENT DOCUMENTS

| | | |
|---|---|---|
| DE | 4126379 | 3/1992 |
| DE | 202006012561 | 11/2006 |
| EP | 0530514 | 3/1993 |
| EP | 0865992 | 9/1998 |
| EP | 1932683 | 6/2008 |
| EP | 2030808 | 3/2009 |
| GB | 1197990 | 7/1970 |
| GB | 2304691 | 3/1997 |
| GB | 2432347 | 5/2007 |

* cited by examiner

*Primary Examiner* — Toan To
(74) *Attorney, Agent, or Firm* — Baker & Hostetler LLP

(57) ABSTRACT

The invention provides a wheeling device for a packaged article which may be directly attached to the packaging of the article and which comprises wheeling means.

The invention also provides a wheelable package for an article comprising at least one wheeling device according to the present invention, the wheeling device being directly attached to the package.

The invention further provides a method of improving the handlability of a packaged article comprising directly attaching to the packaging of the article one or more wheeling devices of the invention.

22 Claims, 5 Drawing Sheets

Fig. 7 ial impact, but may also have cost implications, either for the end user, or for the local authority responsible for disposing of the packaging.

WHEELING DEVICE FOR A PACKAGED ARTICLE

BACKGROUND

The present invention is directed to wheeling devices that may be directly attached to the packing of packaged articles, to packaged articles incorporating such wheeling devices, and to methods for improving the handlability of packaged articles by attaching wheeling devices directly to the packaging of the articles. In particular, the present invention is directed to wheeling devices that may be easily attached to packaged articles, and which may be conveniently recycled or disposed of after use.

The use of packaging materials to protect goods during transport is widespread, and the types of goods that may be transported in packaging range from small lightweight articles (for example multiple packs of confectionary that may be transported in a single box for convenience) to industrial products (including electronic equipment, automotive products and heavy duty mechanical machinery). In addition, relatively large and bulky articles may also be transported in packaging, for example mattresses for beds, which may be shrink wrapped and then rolled and enclosed in packaging for transport. Furthermore, small articles contained in individual packaging boxes may be enclosed in larger containers, again for ease of transport or to aid distribution within supermarkets and large retail stores (so called "shelf-ready" packaging). Packaging may also be used in the form of "wardrobe cases" for transporting clothing etc. during household removals. However, although the use of packaging materials generally aids in the transport of items, when the packages are heavy and/or awkward in shape they may still be difficult to transport by hand, and in many countries health and safety legislation will require that packages above a certain weight and/or above a certain size may only be lifted by two or more people working together, which can significantly increase the cost of moving and handling such packages.

One means for overcoming the above disadvantages of handling large and/or heavy packaged articles has been to transport such articles using wheeled devices, such as trolleys, wheeled pallets or wheeled platforms. However, this is only possible if a suitable wheeled device is available whenever required. In addition, it is still necessary for the packaged articles to be lifted in order to be placed on to the wheeled devices, and there may also be difficulties in retaining the packaged articles on the wheeled devices during transport (for example, if the packages are unstable).

A further approach has been to attach castors to packaged articles, and this is done by inserting a sheet of additional material (normally wood) into the package and attaching the castors to the inserted material through the packaging. This procedure is very labour intensive, however, particularly if it is necessary to open the package to insert the material to which the castors will be attached and to then reclose it, and also has a number of environmental drawbacks. In particular, although most packaging materials are recyclable, a package containing an additional sheet of attachment material, plus castors attached thereto, will be difficult to recycle because of the different materials present. This will require any user wishing to recycle the package to remove the castors (which themselves will be difficult to recycle) and also the sheet of attachment material (which in many cases may be permanently attached to the packaging), and to dispose of each component separately. Thus, in practice, many such wheeled containers are simply disposed of to landfill, rather than dismantled and recycled. This not only has an unwelcome envi-

SUMMARY OF THE INVENTION

The present invention therefore provides a wheeling device for a packaged article which may be directly attached to the packaging of the article and which comprises wheeling means.

Because wheeling devices according to the present invention may be directly attached to the packaging of an article, they are convenient to attach whenever required. In addition, they will also be simple to remove from the packaging, and will therefore allow the packaging to be recycled, and for the devices themselves to be reused or disposed of for recycling.

Devices according to the present invention may comprise wheeling means in the form of wheels, castors or rollers, but most preferably the wheeling means will be a roller, i.e a cylinder having a round cross section, and most preferably having a length greater than its diameter.

Devices according to the present invention may be directly attached to the packaging of an article by any conventional means; however, preferred devices according to the present invention comprise a base plate comprising means to enable the device to be attached to the packaging of the packaged article.

In devices according to the present invention comprising a base plate, the base plate preferably comprises means to enable the device to be attached to the packaging of an article by at least one method selected from: adhering the base plate to the outer surface of the packaging; sandwiching the base plate between two layers of the packaging; attaching the base plate to the packaging by screws, bolts or rivets; attaching the base plate to the packaging by cable ties or strapping; attaching the base plate to the packaging by staples, or attaching the base plate to the packaging by means of a clamp connector which engages an inner surface of the packaging. The means for enabling the base plate to be adhered to the outer surface of the packaged article may comprise a continuous area of the base plate of sufficient surface area to permit the base plate to be adhered to the surface of the packaged article sufficiently firmly to prevent accidental removal during use. Similarly, the means to permit the base plate to be attached to a packaged article by sandwiching the base plate between two layers of the packaging may comprise one or more areas of the base plate which are free from projections, and which may be inserted between two layers of packaging and thereby maintain the base plate in contact with the packaging. The means to permit the base plate to be attached to the packaging by screws, bolts, rivets, cable ties, strapping or staples may comprise holes in the base plate having suitable shapes and distributions; for example, 2, 3 or 4 evenly spaced circular holes permitting attachment by screws, bolts or rivets; or 2 or 4 evenly spaced rectangular holes for attachment by cable ties, strapping or staples.

In particularly preferred embodiments of devices according to the present invention comprising a base plate comprising means to enable the device to be attached to the packaging of a packaged article, the base plate comprises means suitable to enable the device to be attached to the packaging of a packaged article by each of the following methods: adhering the base plate to the outer surface of the packaging; sandwiching the base plate between two layers of the packaging; attaching the base plate to the packaging by screws, bolts or rivets; attaching the base plate to the packaging by cable ties or strapping; attaching the base plate to the packaging by staples, and attaching the base plate to the packaging by means of a clamp connector which engages an inner surface of the packaging.

In devices according to the present invention comprising a base plate comprising means to enable the device to be attached to the packaging of a packaged article by attaching the base plate to the packaging by means of a clamp connector, the clamp connector may be an integral part of the device. Thus, for example, the base plate may incorporate two or more flaps hingedly connected thereto, the flaps being movable between a first position in which they may be inserted through a hole in the packaging, and a second position in which they engage the inner surface of the packaging, the base plate also incorporating means to lock the flaps in the second position and to thereby clamp the base plate to the packaging.

In an alternative preferred embodiment, the means for attaching the device to the packaging of a packaged article by means of a clamp connector which engages the inner surface of the packaging, may comprise an aperture in the base plate suitable to allow a clamp connector engaging the inner surface of the packaging to also engage the surface of the base plate that is not in contact with the packaging when the device is attached to the packaging.

In the preferred embodiment of the present invention in which the base plate comprises an aperture suitable to allow a clamp connector engaging the inner surface of the packaging of a packaged article to also engage the surface of the base plate that is not in contact with the packaging when the device is attached to the packaging, the device preferably further comprises a clamp connector. A suitable clamp connector may comprise a first surface suitable to engage the inner surface of the packaging of a packaged article, and two or more hinged flaps which may be arranged in a first position in which they may be inserted through an aperture in the packaging and the corresponding aperture in the base plate of a device according to the present invention, and which may then be rotated and locked into a second position in which they are in contact with the surface of the base plate that is not in contact with the packaging, to thereby lock the base plate into contact with the packaging. This use of the clamp connector will require access to the inside of the packaging; however, as will be appreciated, such a clamp connector may also be used by inserting the hinged flaps firstly through the aperture in the base plate and then through the aperture in the packaging while in the first position, before locking the flaps into the second position so that they are locked into contact with the inner surface of the packaging, and so that the clamp itself is locked in contact with the surface of the base plate that is not in contact with the packaging.

Most preferably, clamps connectors for use in the present invention will comprise means to conveniently release the hinged flaps from the locked position, so that the clamp connector and the device according to the present invention may be easily removed from the packaged article.

In an alternative embodiment of a device according to the present invention comprising a base plate having means to enable the device to be attached to the packaging of a packaged article, the base plate may comprise a snap connector shaft, and the device may further comprise a collar suitable to attach to the packaging of a packaged article and to receive the snap connector shaft, so that when the collar is attached to the packaging and the snap connector shaft is received in the collar, the base plate may rotate therein, allowing the packaged article to be steered more conveniently. Most preferably, devices according to this embodiment of the invention will also comprise means to allow the snap connector shaft to be removed from the collar when required, and/or means to allow the collar to be removed from the packaging when required.

Preferably in devices according to the present invention comprising a base plate, the base plate will comprise two arms located on the face of the base plate that does not contact the packaging when the device is attached to a packaged article, the arms being positioned on opposing edges of the base plate and extending perpendicular therefrom, and comprising means to connect the wheeling means thereto. Optionally, the means to connect the wheeling means to the arms may comprise a generally circular aperture in each arm, so that an axle about which the wheeling means rotates may be received in each arm.

Wheeling devices according to the present invention may comprise braking means to prevent packages incorporating the wheeling devices from moving unless the braking means are released.

Wheeling devices according to the present invention may be composed of any suitable materials; preferably, however, the devices are substantially composed of recyclable materials. It is also preferred that devices according to the present invention are substantially composed of a single material. Suitable materials include plastics, polypropylenes and nylons, and a particularly preferred material is nylon (for example, nylon 6).

Wheeling devices according to the present invention may be of any size, depending upon the size and weight of the packages with which they are to be used.

Wheeling devices according to the present invention may be attached to all types of packaging material, particularly corrugated board or corrugated plastic.

Wheeling devices according to the present invention may be attached to packaging enclosing all sorts of goods, ranging from mattresses, single or multiple electrical goods, bulky lightweight food products and also to point of sale items and wardrobe cases for hanging garments.

Wheeling devices according to the present invention may be attached to packages for articles either by the manufacturer of the packages (i.e at any stage during the manufacture of the packages) or by the user of the packages, either before or after articles have been added to the packages. Attaching wheeling devices according to the present invention to packages before they have been filled will avoid the need to lift the filled packages before transporting them.

Wheeling devices according to the present invention may be manufactured by any conventional means, but are preferably manufactured by injection moulding.

The present invention further provides a wheelable package for an article comprising at least one wheeling device according to the present invention, the wheeling device being directly attached to the package.

Wheelable packages according to the present invention may comprise any number of wheeling devices according to the present invention. For example, a single wheeling device may be sufficient to improve the handlability of light-weight packages or packages having relatively small lower surfaces. Alternatively, particularly large articles may require numerous wheeling devices, for example up to 10 or more. Most preferably however, wheelable packages according to the present invention comprise 1, 2, 3 or 4 wheeling devices according to the present invention.

Wheelable packages according to the present invention may comprise any suitable rigid or semi-rigid packaging materials; however preferred packaging materials comprise corrugated board or corrugated plastic (for example Correx and derivatives). The packaging may be of any thickness, for example 3 mm, 5 mm or 25 mm.

Wheelable packages according to the present invention preferably have weights of between 5 kg and 100 kg, more preferably between 10 kg and 50 kg.

Packages according to the present invention are preferably closed containers (i.e boxes), but may also include open containers or materials that partially enclose an article.

Packages according to the present invention may be used to package a wide range of goods, including mattresses, single or multiple electrical goods (for example washing machines or fridge/freezers), bulky lightweight food products (for example multiple packets of crisps etc), or they may comprise point of sale items or wardrobe cases for hanging garments.

Wheelable packages according to the present invention may comprise combinations of different embodiments of wheeling devices according to the present invention. For example, the packages may comprise one or more wheeling devices attached in a fixed orientation and one or more wheeling devices rotatably attached to the package to improve the steerability of the package (for instance, a package may comprise four wheeling devices arranged in a rough square on the lower surface of the package, two adjacent wheeling devices being fixed in their orientation, and the other two wheeling devices being rotatable).

Wheelable packages according to the present invention will generally comprise wheeling devices according to the present invention attached to their lower surface, so that the packages rest on the wheeling devices at all times. However, in an alternative embodiment, the wheelable packages may comprise an angled surface linking the lower surface of the package to one of the vertical walls thereof, and to which one or more wheeling devices are attached, so that when the wheelable package is not being wheeled, the lower surface of the package is in contact with the ground and the wheeling device or devices either also touch the ground or are not in contact with the ground, but also so that when the wheelable package is titled, the weight of the package is taken by the wheeling device or devices, and the lower surface of the package no longer contacts the ground so that the wheelable package may be wheeled.

The present invention also provides a method of improving the handlability of a packaged article comprising directly attaching to the packaging of the article one or more wheeling devices according to the present invention.

Embodiments of the invention will now be described by way of example, with reference to the drawings in which.

BRIEF DESCRIPTION OF THE FIGURES

DETAILED DESCRIPTION OF PREFERRED EMBODIMENTS

Figure 1:
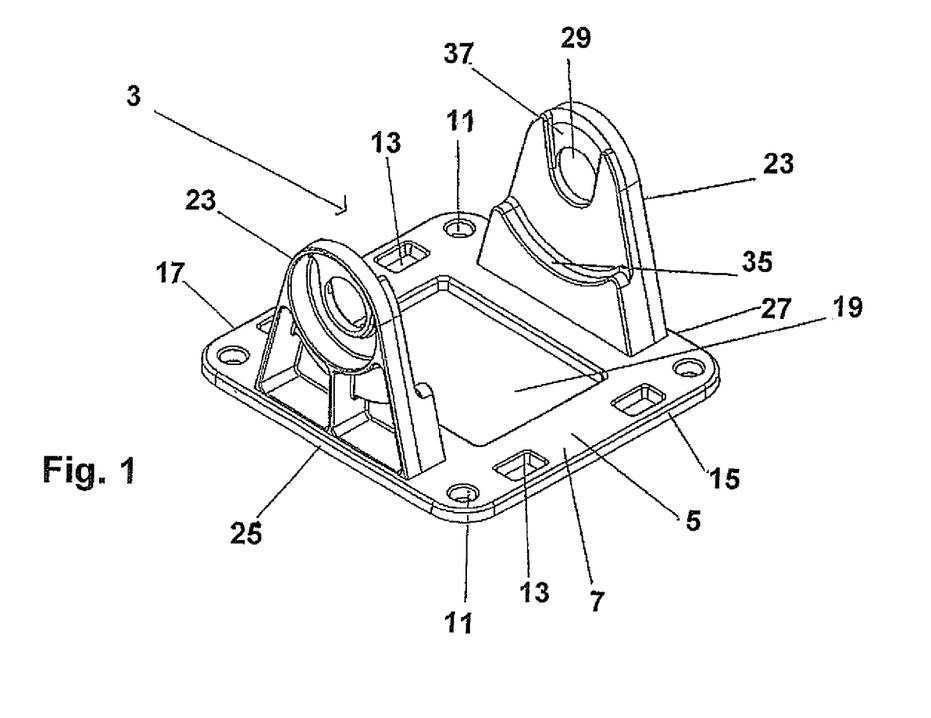
FIG. 1 shows a chassis component of a wheeling device according to a first embodiment of the present invention.

FIG. 1 shows a chassis 3 forming part of a wheeling device 1 according to a first embodiment of the present invention. The chassis 3 comprises a base plate 5, having a first side 7, and a second side 9 (shown in FIG. 3). The base plate 5 includes various means to permit the wheeling device 1 to be connected to the packaging of a packaged article. These means include four circular holes 11, one positioned at each corner of the base plate 5. The circular holes 11 are suitable to permit the base plate 5 to be attached to the packaging of a packaged article by means of screws, bolts or rivets. The attachment means also include four rectangular holes 13, two of the rectangular holes being positioned along a first side 15 of the base plate 5, and the other two rectangular holes 13 being positioned along the opposing second side 17 of the base plate 5. The rectangular holes 13 are suitable to permit the base plate 5 to be attached to the packaging of a packaged article by means of staples, cable ties or strapping. Further means for permitting the wheeling device 1 according to the first embodiment of the present invention to be attached to the packaging of a packaged article include a rectangular aperture 19 positioned in the centre of the base plate 5, and which permits the base plate 5 to be attached to the packaging of the packaged article by means of clamp connector 21 (see FIGS. 4 and 5). As will be appreciated from FIGS. 1 and 3, the base plate 5 of the wheeling device 1 according to the first embodiment of the present invention may also be connected to the packaging of a packaged article by sandwiching the base plate 5 between two layers of the packaging material, or by adhering the second side 9 of the base plate 5 to the packaging of a packaged article by use of an adhesive material. The wheeling device 1 according to the first embodiment of the present invention may also be connected to the packaging of a packaged article by the use of strapping passing across the first side 7 of the base plate 5 and around the packaged article.

The chassis 3 shown in FIG. 1 is also provided with two arms 23, one arm 23 being located at the third side 25 of the base plate 5, and the other arm 23 being located at the opposing fourth side 27 of the base plate 5. The arms 23 are perpendicular to the base plate 5, and are each provided with a circular hole 29 suitable to receive the axle 31 of a roller 33 (see FIGS. 2 and 3). Each of the arms 23 comprise a supporting ledge 35 and a recess 37 (discussed below).

The length of the first and second sides 15, 17 of the base plate 5 is 78 mm, and the length of the third and fourth sides 25, 27 is 80 mm. The base plate has a thickness of 3 mm.

Figure 2:
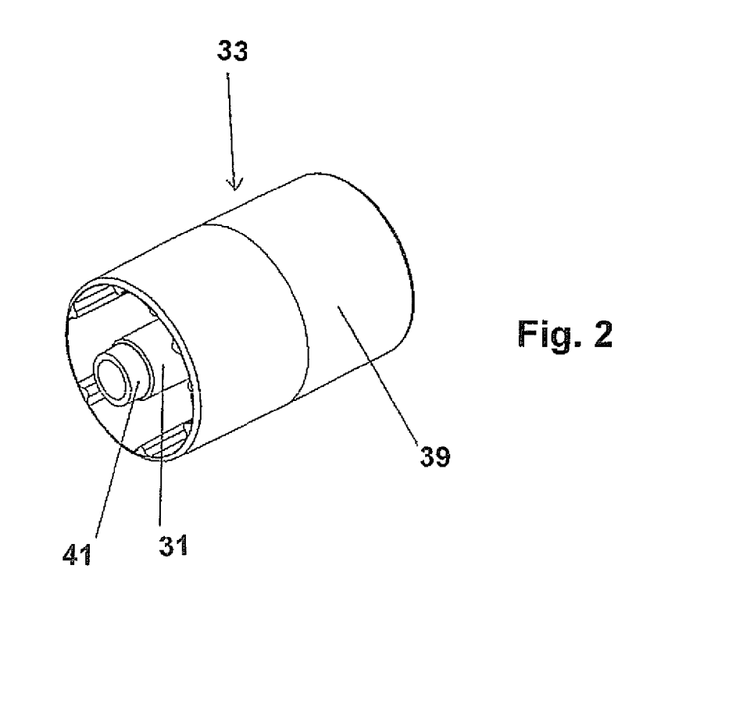
FIG. 2 shows a roller of a wheeling device according to the first embodiment of the present invention.
Figure 3:
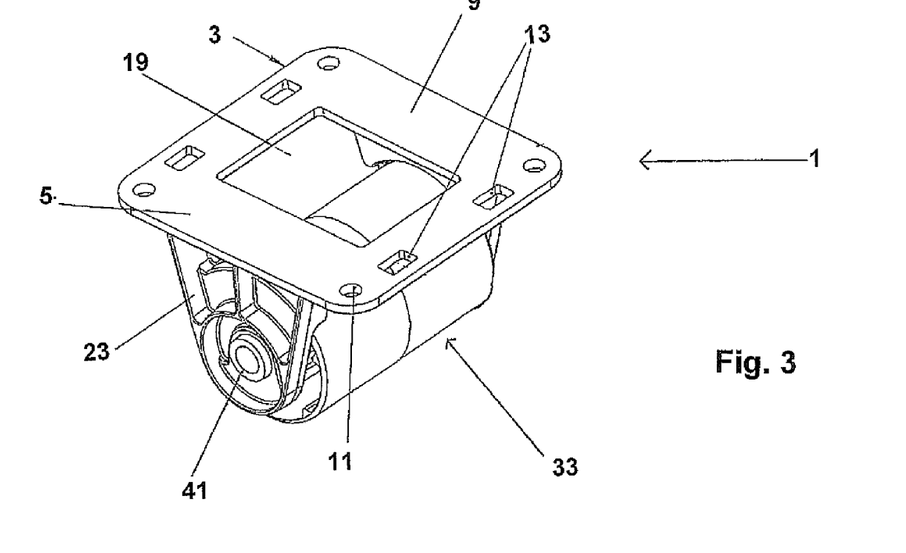
FIG. 3 shows an assembled wheeling device according to the first embodiment of the present invention.

FIG. 2 shows a roller 33 for use in combination with the chassis 3 shown in FIG. 1. The roller 33 has a cylindrical surface 39, and a central axle 31 to which the cylindrical surface 39 is permanently attached. The cylindrical surface 39 has a length of 70 mm. The diameter of the roller is 40 mm. The axle 31 comprises two ends 41, each end 41 projecting beyond the cylindrical surface 39 of the roller 33. Each end 41 of the axle 31 is sized to engage the circular hole 29 in one of the arms 23 of the chassis 3, so that (as shown in FIG. 3) the roller 33 may be attached to the chassis 3 of the wheeling device 1 with each end 41 of the axle 31 being supported by an arm 23. Insertion of the ends 41 of the axle 31 into the circular holes 29 is facilitated by the recesses 37 in each of the arms 23. The length of the axle 31, including the ends 41, is 76 mm, which is greater than the distance between the circular holes 29 of the arms 23, and therefore the ends 41 of the axle 31 will project through the arms 23, so that the roller 33 is retained in the chassis 3 and can rotate freely with respect to the chassis 3. Optionally, retaining clips or washers (not shown) may be inserted over the ends 41 of the axle 31 once the roller 33 is positioned in the chassis 3 to help retain the roller 33 in this position.

Once the ends 41 of the axle 31 of the roller 33 are located in the holes 29 in the arms 23 of the chassis 3, as shown in FIG. 3, the roller 33 will overlap, but will not contact, the supporting ledges 35 located on the arms 23. However, once the wheeling device 1 is attached to a package so that the weight of the package is supported by the roller 33, excessive weight in the package will cause the roller 33 to contact the supporting ledges 35 before the engagement between the roller 33 and the arms 23 of the chassis 3 is disrupted, which will prevent the roller 33 being accidentally removed from the chassis 3.

FIG. 3 shows a wheeling device 1 according to the first embodiment of the present invention comprising a roller 33 as shown in FIG. 2 attached to a chassis 3 as shown in FIG. 1. As discussed with respect to FIGS. 1 and 2, the ends 41 of the axle 31 of the roller 33 are located in, and project through, the circular holes 29 in the arms 23 of the chassis 3, so that the roller 33 is retained in the chassis 3 and is free to rotate. As discussed with respect to FIG. 1, the wheeling device 1 may be attached to the packaging of a package by numerous means, including any of: adhering the second side 9 of the base plate 5 of the chassis 3 to the packaging, sandwiching the base plate 5 between two layers of packaging, screwing, bolting or riveting the base plate to the packaging by use of the circular hole 11 in each corner of the base plate 5, attaching the base plate 5 to the packaging by the use of staples, cable ties or strapping inserted through the rectangular holes 13 located on the first and second sides 15, 17 of the base plate 5, or by use of a clamp connector 21 inserted through the central rectangular aperture 19 of the base plate 5.

The chassis 3 and roller 33 of the wheeling device 1 are all made from Nylon 6, although other plastic materials (preferably easily recyclable materials) could be used. The chassis 3 and roller 33 are both preferably formed by injection moulding.

Figure 4:
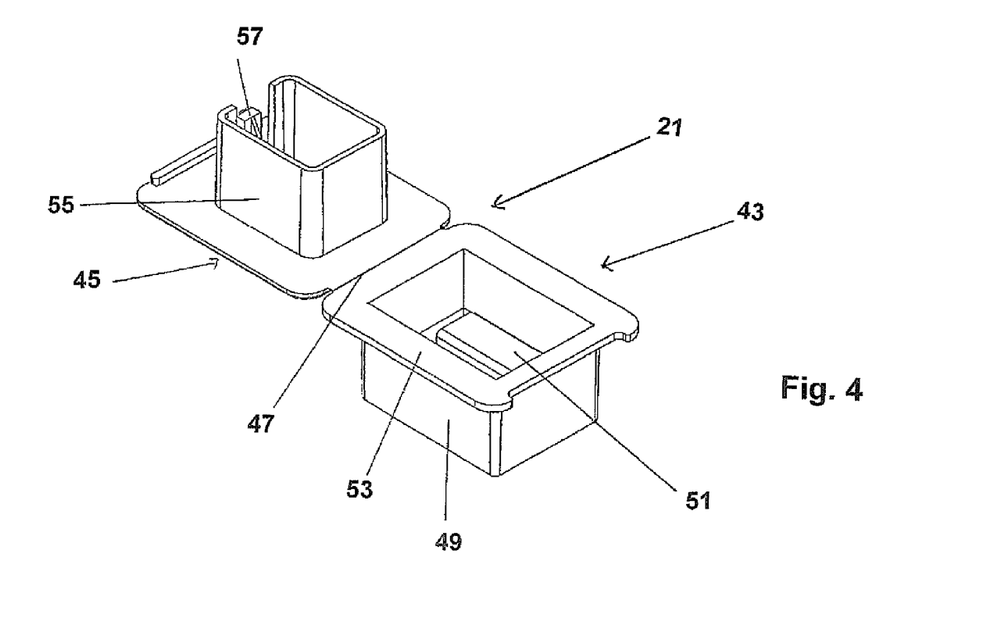
FIG. 4 shows a clamp connector for use with the wheeling device according to the first embodiment of the present invention shown in FIGS. 1 to 3.

FIG. 4 shows a clamp connector 21 for use in attaching a wheeling device 1 as shown in FIG. 3 to the packaging of a packaged article. The clamp connector 21 comprises a first component 43 and a second component 45 linked by a hinge 47. The first component 43 comprises a collar 49 inside which are located two hinged flaps 51. The hinged flaps 51 are positioned within the collar 49 so that, in a first position, they are retained completely within the circumference of the collar 49, but they may also be rotated into a second position, in which they project outwards from the collar 49. The first component 43 also comprises a rim 53 surrounding the collar 49.

The second component 45 of the clamp connector 21 comprises an internal collar 55 sized to fit within the collar 49 of the first component 43 so that, when the internal collar 55 is inserted into the collar 49 of the first component 43 the hinged flaps 51 are moved from the first position within the collar 49 to the second position extending beyond the collar 49. In addition, the internal collar 55 of the second component 45 comprises locking means 57 enabling the internal collar 55 to be locked within the collar 49, and to thereby lock the hinged flaps 51 in the second position. The locking means 57 also comprises release means (not shown) so that, when required, the second component 45 may be released and rotated around the hinge 47, removing the internal collar 55 from inside the collar 49 of the first component 43, and allowing the hinged flaps 51 to be moved from the second position into the first position.

The clamp connector 21 shown in FIG. 4 is made from polypropylene, but could be made from any other (preferably recyclable) plastic material, for example Nylon 6. The clamp connector 21 is preferably produced by injection moulding. Clamp connectors as shown in FIG. 4 are commercially available, for example from Item Products (NPD) Limited, UK.

Figure 5:
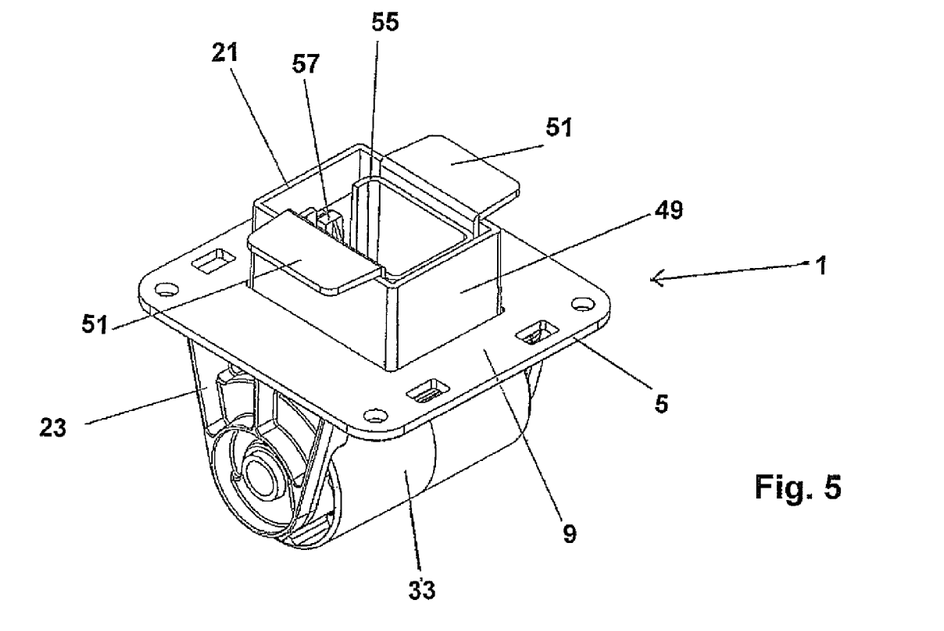
FIG. 5 shows the clamp connector shown in FIG. 4 inserted into the wheeling device according to the first embodiment of the present invention shown in FIG. 3.

As shown in FIG. 5, the clamp connector 21 shown in FIG. 4 may be used to connect a wheeling device 1 according to a first embodiment of the present invention to the packaging of a packaged article. For such use, the size of the collar 49 of the clamp connector 21 is selected to match the size of the rectangular aperture 19 in the base plate 5 of the chassis 3 of the wheeling device 1, and the height of the collar 49 of the clamp connector 21 is selected to correspond to the thickness of the packaging to which the wheeling device 1 is to be attached. In addition, the packaging of the packaged article will be provided with one or more pre-cut holes corresponding in size to the dimensions of the collar 49 of the clamp connector 21.

In order to attach the wheeling device 1 according to a first embodiment of the present invention to a package by use of the clamp connector 21, the roller 33 is removed from the chassis 3 of the wheeling device 1 and the clamp connector 21 is opened as shown in FIG. 4. The collar 49 of the first component 43 of the clamp connector 21 is inserted through the rectangular aperture 19 of the base plate 5 from the direction of the first side 7, until the rim 53 of the first component 43 of the clamp connector contacts the first side 7 of the base plate 5. The collar 49 is then inserted into the hole provided in the packaging material of the packaged article until the second side 9 of the base plate 5 contacts the outer surface of the packaging material. At this stage the hinged flaps 51 are retained within the collar 49 of the clamp connector 21, so that they do not interfere with the passage of the collar 49 through the packaging. The second component 45 of the clamp connector 21 is then rotated around the hinge 47 so that the internal collar 55 of the second component 45 is inserted into the collar 49 of the first component 40, and so that the hinged flaps 51 are rotated out of the collar 49 and into engagement with the internal surface of the packaging. The locking means 57 locks the second component 45 in this position, so that the internal collar 55 is retained within the collar 49 of the first component, and so that the hinged flaps 51 are retained in contact with the internal surface of the packaging, locking the chassis in contact with the packaging of the packaged article.

The roller 33 is then inserted into the arms 23 of the chassis, so that the ends 41 of the axle 31 engage, and are retained by, the circular holes 29 in the arms 23. The wheeling device 1 may then support the weight of the package and improve the handlability thereof. If required, a number of wheeling devices 1 may be attached to the same surface of the packaged article.

In order to remove the wheeling device 1 from the package, the roller 33 is removed from the arms 23 of the chassis 3, and the locking means 57 of the clamp connector 21 is released, so that the internal collar 55 of the second component 45 may be rotated out of the collar 49 of the first component, releasing the hinged flaps 51. The clamp connector 21, or the chassis 3, is then pulled away from the packaging, which will cause the hinged flaps 51 to move from the second position into the first position within the collar 49 of the first component 43 of the clamp connector 21, allowing the chassis 3 and the clamp connector 21 to be removed from the packaging. The clamp connector 21 may then be removed from the chassis 3 and the roller 33 may be reinserted into the chassis 3 so that the wheeling device 1 may be re-used, or the roller 33 and/or the chassis 3 may be disposed of for recycling. Similarly, the package may either be reused or may be disposed of. If the package is disposed of it will be simple to recycle because the wheeling means were removed before disposal.

Wheeling devices 1 as shown in FIGS. 1 to 3 may be connected to packages by packaging manufacturers, or may be provided separately for attachment to packages by end users. They may also be provided in conjunction with clamp connectors of the type shown in FIG. 4.

Figure 6:
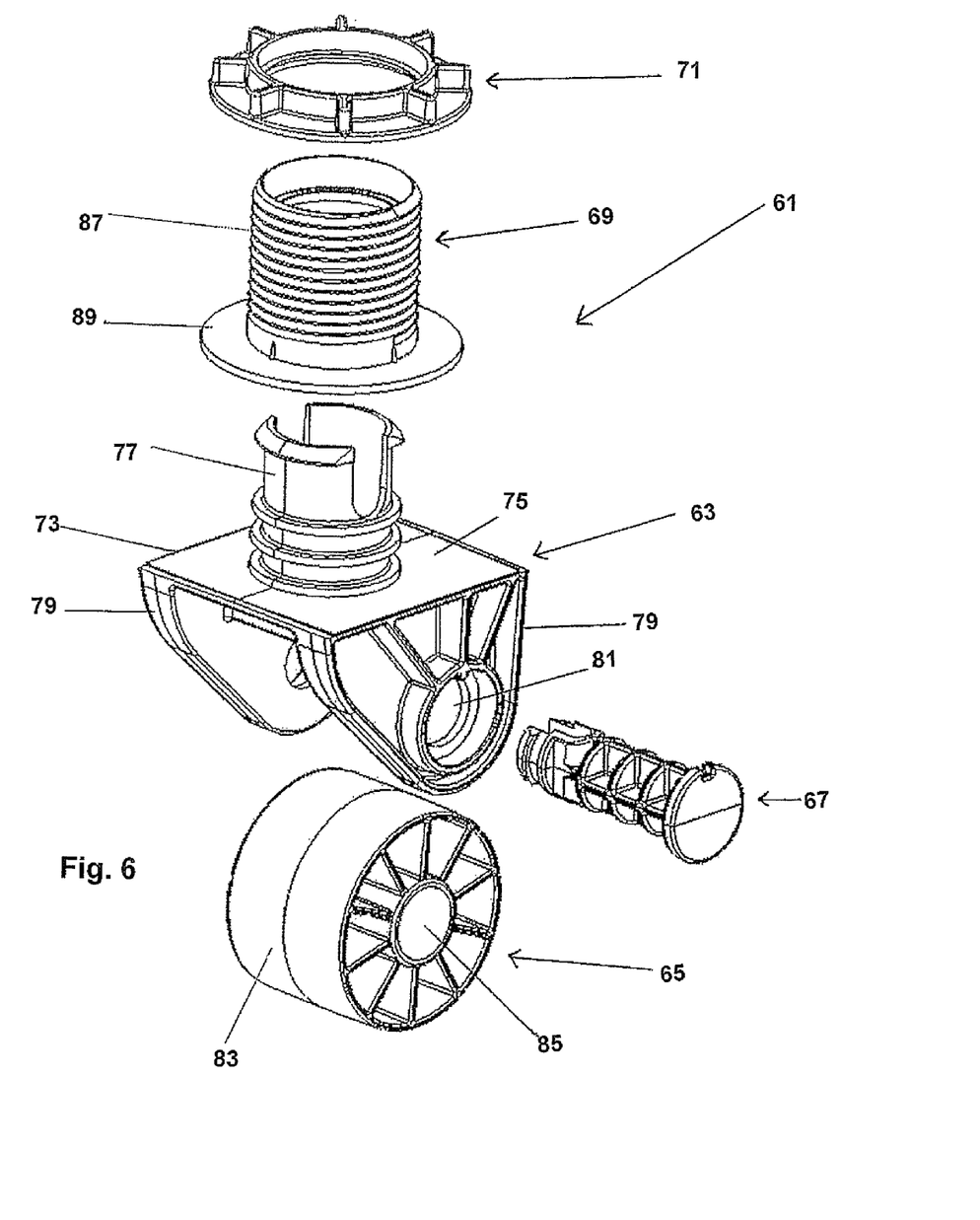
FIG. 6 shows the components of a wheeling device according to a second embodiment of the present invention.

FIG. 6 shows the components of a wheeling device 61 according to a second embodiment of the present invention. The wheeling device 61 comprises a chassis 63, a roller 65, a locking pin 67, a collar 69 and a locking ring 71.

The chassis 63 of the wheeling device 61 according to the second embodiment of the present invention comprises a base plate 73 having a first side 75 and a second side (not shown). The base plate 73 also comprises a snap connector shaft 77 located in the centre of its first side 75. The base plate 73 further comprises two arms 79 located at opposing edges of the second side of the base plate 73, and extending perpendicularly therefrom. Each of the arms 79 incorporates a circular hole 81.

The roller 65 comprises a cylindrical surface 83 and a hollow central shaft 85 connected to the cylindrical surface 83. The roller 65 may be attached to the chassis 63 by positioning it between the two arms 79 of the chassis 63 and inserting the locking pin 67 through the circular hole 81 in one of the arms 79, then through the central shaft 85 of the roller 65 and finally through the circular hole 81 in the second arm 79. The locking pin 67 and the arms 79 of the chassis 63 comprise mutually engaging locking means, so that the locking pin 67 may be retained in the chassis 63 during normal use of the wheeling device 61, but also so that, when required, the locking pin 67 may be removed from the chassis 63 to release the roller 65. When the roller 65 is attached to the chassis 63 by the locking pin 67 it may rotate freely around the locking pin 67.

The collar 69 of the wheeling device 61 comprises a receiving shaft 87 and a surrounding rim 89. The receiving shaft 87 is sized to accommodate the snap connector shaft 77 of the chassis 63, and the collar 69 and snap connector shaft 77 comprise complimentary engaging means, so that when the snap connector shaft 77 is inserted into the receiving shaft 87 of the collar 69, it will be retained therein during normal use of the wheeling device 61, and so that the snap connector shaft 77 may rotate within the collar 69.

The outer surface of the receiving shaft 87 of the collar 69 and the locking ring 71 comprise mutually engaging screw threads, so that the locking ring 71 may be attached to the collar 69, and so that the distance between the locking ring 71 and the rim 89 of the collar 65 may be varied by rotating the locking ring 71.

The wheeling device 61 according to the second embodiment of the present invention may be attached to the packaging of a packaged article by inserting the receiving shaft 87 of the collar 69 through a pre-cut hole in the packaging material until the rim 89 engages the outer surface of the packaging. The locking ring 71 may then be attached to the receiving shaft 87 of the collar 69 and rotated until it engages the inner surface of the packaging, locking the collar in place. The locking ring 71 and collar 69 may optionally comprise releasable locking means, so that the locking ring 71 may be fixed in position until it is necessary for the wheeling device 61 to be removed from the packaging.

The chassis 63 may then be connected to the packaged article by inserting the snap connector shaft 77 of the chassis 63 into the central shaft 87 of the collar, so that the chassis 63 is retained in contact with the packaging but is free to rotate, and the roller 65 may then be attached to the chassis 63 by use of the locking pin 67. It will be appreciated that the order in which the above operations are carried out may be varied as required.

All of the components of the wheeling device 61 according to the second embodiment of the present invention are constructed of Nylon 6, however it will be understood that other plastic materials or polypropylenes, particularly recyclable materials, may be used for any of the components. The components shown in FIG. 6 are all formed by injection moulding.

Wheeling devices according to the first and second embodiments 1, 61 of the present invention may be used singly or in combination with other wheeling devices. Thus, in some cases a single wheeling device 1, 61 will be sufficient to enable the packaged article to be transported by wheeling; however, if required, multiple wheeling devices 1, 61 may be attached to the same surface of the packaged article. For example, 2, 3, 4 or more wheeling devices 1 according to the first embodiment of the invention, or 2, 3, 4 or more wheeling devices 61 according to the second embodiment of the present invention may be attached to a packaged article. Alternatively, one or more wheeling devices 61 in accordance with the second embodiment of the present invention may be used in combination with one or more wheeling devices 1 according to the first embodiment of the present invention.

It will also be appreciated that various features of the first and second embodiments of the wheeling devices shown in FIGS. 1 to 6 may be varied. For example, the base plate 5 of the wheeling device 1 according to the first embodiment of the present invention may be replaced by the base plate 73 of the wheeling device 61 according to the second embodiment to the invention, so that the roller 33 shown in FIG. 2 may be attached to the packaging of packaged articles by use of a snap connector shaft, as discussed above with respect to FIG. 6. Alternatively, the base plate 73 of the wheeling device 61 according to the second embodiment of the invention may be replaced by the base plate 5 of the wheeling device 1 according to the first embodiment of the present invention, so that the roller 65 shown in FIG. 6 may be attached to the packaging of packaged articles by use of the various connecting means discussed with respect to FIGS. 1 to 5.

Figure 7:
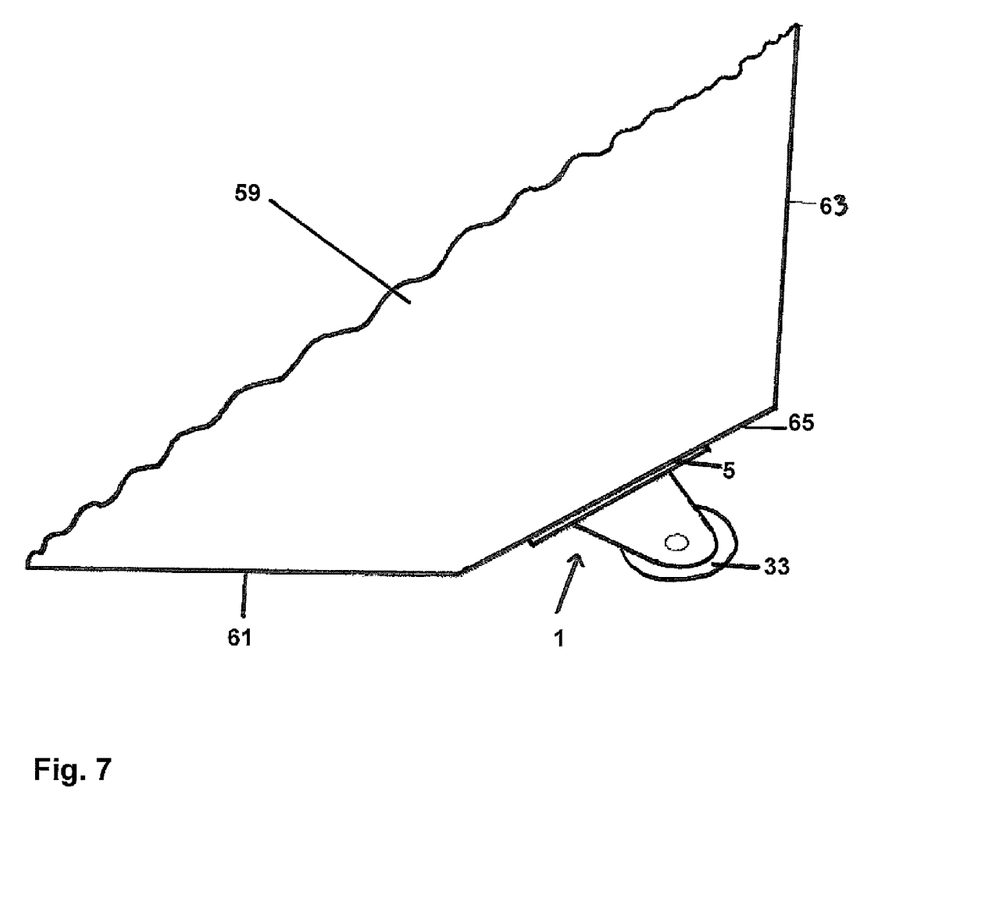
FIG. 7 shows a wheeling device according to the first embodiment of the present invention attached to a package.

FIG. 7 shows a wheeling device 1 according to the first embodiment of the present invention attached to a package 59 for an article (only a portion of the package 59 is shown in the Figure).

The package 59 has a lower surface 61 and a verticle surface 63, and the lower surface 61 and the verticle surface 63 are connected by an angled surface 65. A wheeling device 1 according to the first embodiment of the present invention is attached to the angled surface 65 of the package 59 via the base plate 5. The base plate 5 may be attached to the angled surface 65 of the package 59 by any of the means discussed with respect to FIGS. 1 to 5, for example by use of a clamp connector 21 as shown in FIGS. 4 and 5.

The wheeling device 1 is located on the angled surface 65 of the package 59 so that, when the lower surface 61 of the package 59 rests on a horizontal surface the roller 33 of the wheeling device 1 will also contact the horizontal surface and will help the stabilise the package 59. When required however, the package 59 may be tilted (for example by using a handle, not shown) around the roller 33 of the wheeling device 1, so that the lower surface 61 of the package 59 is moved out of contact with the horizontal surface, and so that the package 59 may then be transported by wheeling on the wheeling device 1.

In the arrangement shown in FIG. 7 the wheeling device 1 may be a single wheeling device, however preferably the package 59 will comprise two wheeling devices 1 located side by side on the angled surface 65, so that the rollers 33 of each wheeling device 1 will both contact any horizontal surface on which the lower surface 61 of the package 59 is rested, and so that, when the package 59 is titled to move the lower surface 61 out of contact with the horizontal surface, the rollers 33 of each of the wheeling devices 1 engage the horizontal surface to the same extent and provide equal support to the package 59.

The package 59 shown in FIG. 7 may be composed of any suitable packaging material, for example corrugated board of 12 mm to 15 mm thickness, and the package 59 may be used to contain any suitable articles, for example a shrink wrapped and rolled mattress.

What is claimed:

1. A wheeling device that is configured to be directly attached to the packaging of a packaged article, the wheeling device comprising:
    a base plate;
    a clamp connector coupled to the base plate and configured to engage an inner surface of the packaging, the clamp connector including a first component having a first collar, a second component having a second collar, and a hinge that links the first component to the second component such that the second component is configured to have an open position relative to the first component and a closed position relative to the first component whereby the first collar receives the second collar when the second component is in the closed position; and
    a roller attached to the base plate.

2. A device as claimed in claim 1 wherein the base plate comprises an aperture, so that when the device is attached to the packaging of a packaged article by the clamp connector, the clamp connector engages a surface of the base plate that is not in contact with the packaging.

3. A device as claimed in claim 2, wherein the base plate comprises two arms located on the face of the base plate which does not contact the packaging of the packaged article when the device is attached to the packaging of the packaged article, the arms being positioned on opposing edges of the base plate and extending perpendicularly therefrom, and comprising means to connect the roller thereto.

4. A device as claimed in claim 3 wherein the roller is configured to rotate with respect to the packaging of the packaged article to which the device is attached so that the packaged article may be steered.

5. A device as claimed in claim 1 wherein the wheeling device is substantially composed of recyclable materials.

6. A device as claimed in claim 1 wherein the wheeling device is substantially composed of a single material.

7. A device as claimed in claim 6, wherein the wheeling device is substantially composed of nylon.

8. A device as claimed in claim 1, wherein the first collar has a height relative to the base plate that corresponds to a thickness of the packaging.

9. A device as claimed in claim 1, wherein the first component further includes at least two hinged flaps that are disposed within the collar such that when in a first position the at least two hinged flaps are retained completely within a periphery of the first collar and when in a second position the at least two hinged flaps project outward from the periphery of the first collar.

10. A device as claimed in claim 9, wherein the at least two hinged flaps are configured to be rotated from the first position to the second position when the second component is in the closed position.

11. A device as claimed in claim 10, wherein the clamp connector further includes a lock that is configured to fix the second component in the closed position and the at least two flaps in the second position.

12. A device as claimed in claim 1, wherein the base plate defines an aperture that is configured to receive the first collar.

13. A device as claimed in claim 1, wherein the roller is removably attached to the base plate.

14. A device as claimed in claim 1, wherein the clamp connector is integral with the base plate.

15. A wheelable package comprising;
    a packaged article including a packaging; and
    at least one wheeling device having a base plate, a roller coupled to the base plate, and a clamp connector that is coupled to the base plate, the clamp connector including a first component having a first collar, a second component having a second collar, and a hinge that links the first component to the second component such that the second component is configured to have an open position relative to the first component and a closed position relative to the first component whereby the first collar receives the second collar when the second component is in the closed position to thereby cause the clamp connector to engage an inner surface of the packaging to thereby and directly attach the at least one wheeling device to the packaging.

16. A wheelable package for an article as claimed in claim 15, wherein the package comprises corrugated board or corrugated plastic.

17. A wheelable package for an article as claimed in claim 15, wherein the wheelable package has a weight of between 5 kg and 100 kg.

18. A wheelable package for an article as claimed in claim 15, wherein the package contains one or more articles selected from mattresses, electrical items, bulky lightweight food products, or wherein the package is a point of sale display or a wardrobe case for hanging garments.

19. A wheelable package for an article as claimed in claim 15, wherein the wheelable package has a weight of between 10 kg and 50 kg.

20. A wheelable package for an article as claimed in claim 15, wherein the clamp connector is integral with the base plate.

21. A method of improving the handlability of a packaged article the method comprising the steps of:
    providing an article having packaging;
    directly attaching to the packaging of the article one or more wheeling devices for packaged articles, whereby each wheeling device includes a base, a roller attached to the base, and a clamp connector that is coupled to the base, the attaching step comprising the step of moving a second component of each clamp connector relative to a respective first component of each clamp component such that a collar of each second component is received by a collar of each respective first component to thereby cause the clamp connectors to engage an inner surface of the packaging and directly attach the respective wheeling devices to the packaging.

22. A method as recited in claim 21, wherein the clamp connector is integral with the base plate.

\* \* \* \* \*